United States Patent
Peek et al.

(10) Patent No.: US 7,440,496 B2
(45) Date of Patent: Oct. 21, 2008

(54) APPARATUS AND METHOD TO EXTEND COMMUNICATION RANGE

(76) Inventors: Gregory A. Peek, 13900 NW. Mason Hill Road, North Plains, OR (US) 97133; Evan R. Green, 3062 NW. Telshire Ter., Beaverton, OR (US) 97006; Gary N. Matos, 14218 NW. Eagle Ridge La., Portland, OR (US) 97229; Keith R. Tinsley, 6280 SW. Timberland Pl., Beaverton, OR (US) 97007

( * ) Notice: Subject to any disclaimer, the term of this patent is extended or adjusted under 35 U.S.C. 154(b) by 799 days.

(21) Appl. No.: 10/646,448

(22) Filed: Aug. 22, 2003

(65) Prior Publication Data
US 2005/0265482 A1  Dec. 1, 2005

(51) Int. Cl.
*H04B 1/38* (2006.01)
*H04L 5/16* (2006.01)

(52) U.S. Cl. .................. 375/220; 375/219; 375/222; 375/297; 375/267; 375/347

(58) Field of Classification Search ............... 375/132, 375/219, 220, 222, 260, 261, 297, 267, 299, 375/347; 342/372; 455/562.1; 370/280
See application file for complete search history.

(56) References Cited

U.S. PATENT DOCUMENTS

| | | | |
|---|---|---|---|
| 6,005,884 A * | 12/1999 | Cook et al. .................. | 375/132 |
| 6,226,275 B1 * | 5/2001 | Yang et al. .................. | 370/280 |
| 6,784,837 B2 * | 8/2004 | Revankar et al. ............ | 342/372 |
| 6,983,174 B2 * | 1/2006 | Hoppenstein et al. .... | 455/562.1 |

OTHER PUBLICATIONS

LINKSYS Product Data Sheet, "Wireless Signal Booster", 2002, http://www/linksys.com.

* cited by examiner

*Primary Examiner*—Phuong Phu
(74) *Attorney, Agent, or Firm*—Kenneth J. Cool, P.C.

(57) ABSTRACT

Briefly, in accordance with an embodiment of the invention, an apparatus to extend communication range is provided. The apparatus may be coupled to a wireless local area network (WLAN) access point (AP) and may include at least one low noise amplifier, a power amplifier, and two circulators.

5 Claims, 3 Drawing Sheets

APPARATUS AND METHOD TO EXTEND COMMUNICATION RANGE

BACKGROUND

In order to reduce cost, some radios have limited transmit power and receive sensitivity. This may limit range and throughput of a network, especially in indoor applications. System designers are continually searching for alternate ways to extend communication range and throughput in wireless networks.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

Figure 1:
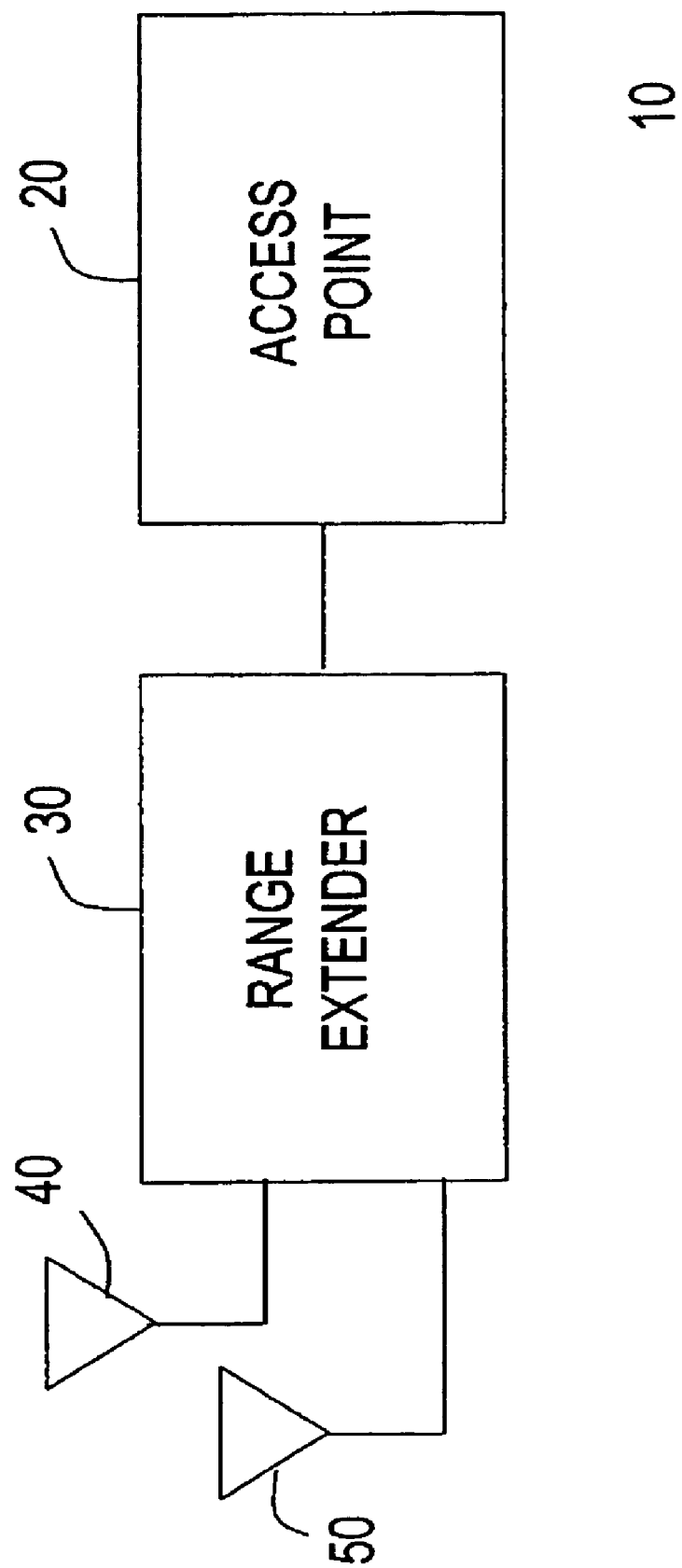
FIG. 1 is a schematic diagram illustrating a portion of a communication system in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "include" and "comprise," along with their derivatives, may be used, and are intended to be treated as synonyms for each other. In addition, in the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment of a portion of a communication system 10 is illustrated. Communication system 10 may include an access point 20 coupled to a range extender 30. Antennas 40 and 50 may be coupled to range extender 30.

In one embodiment, communication system 10 may be part of a wireless local area network (WLAN) system such as, for example, a communication system substantially conforming to an Industrial Electrical and Electronics Engineers (IEEE) 802.11 standard, although the scope of the present invention is not limited in this respect.

Access point 20 may be used to permit communication access of a mobile device (not shown) with network infrastructure (not shown). Access point 20 may also be a base station or gateway in different applications. Range extender 30 may be used to amplify outgoing and incoming transmissions. For example, range extender 30 may be used to amplify outgoing radio frequency (RF) signals to have an output power of about one watt or 30 dBm. Range extender 30 may also be used to increase receive sensitivity by amplifying the relatively low power incoming RF signals. Accordingly, range extender 30 may increase communication range and receive sensitivity of access point 20, thereby increasing communication range and throughput of the network.

Although the scope of the present invention is not limited in this respect, range extender 30 may be an add-on module, and may be coupled to the antenna connectors of access point 20. In some embodiments, control signals and power may be supplied from access point 20 to range extender 30.

Antennas 40 and 50 may be the original antennas supplied with access point 20, or may be different, higher gain antennas compared to the original antennas, to add additional range to the system. In various embodiments, antennas 40 and 50 may be highly directional antennas or omni-directional antennas. For example, antennas 40 and 50 may be omni-directional antennas having a non-directive radiation pattern, e.g., capable of receiving signals from many angles. Alternatively, antennas 40 and 50 may be a directive antennas having a directive radiation pattern, e.g., capable of receiving signals from fixed angles. Examples of omni-directional antennas include a "whip" or "stub" antenna and examples of a directive antenna include a microstrip patch antenna. Antennas 40 and 50 may be spaced apart to provide antenna diversity.

Figure 2:
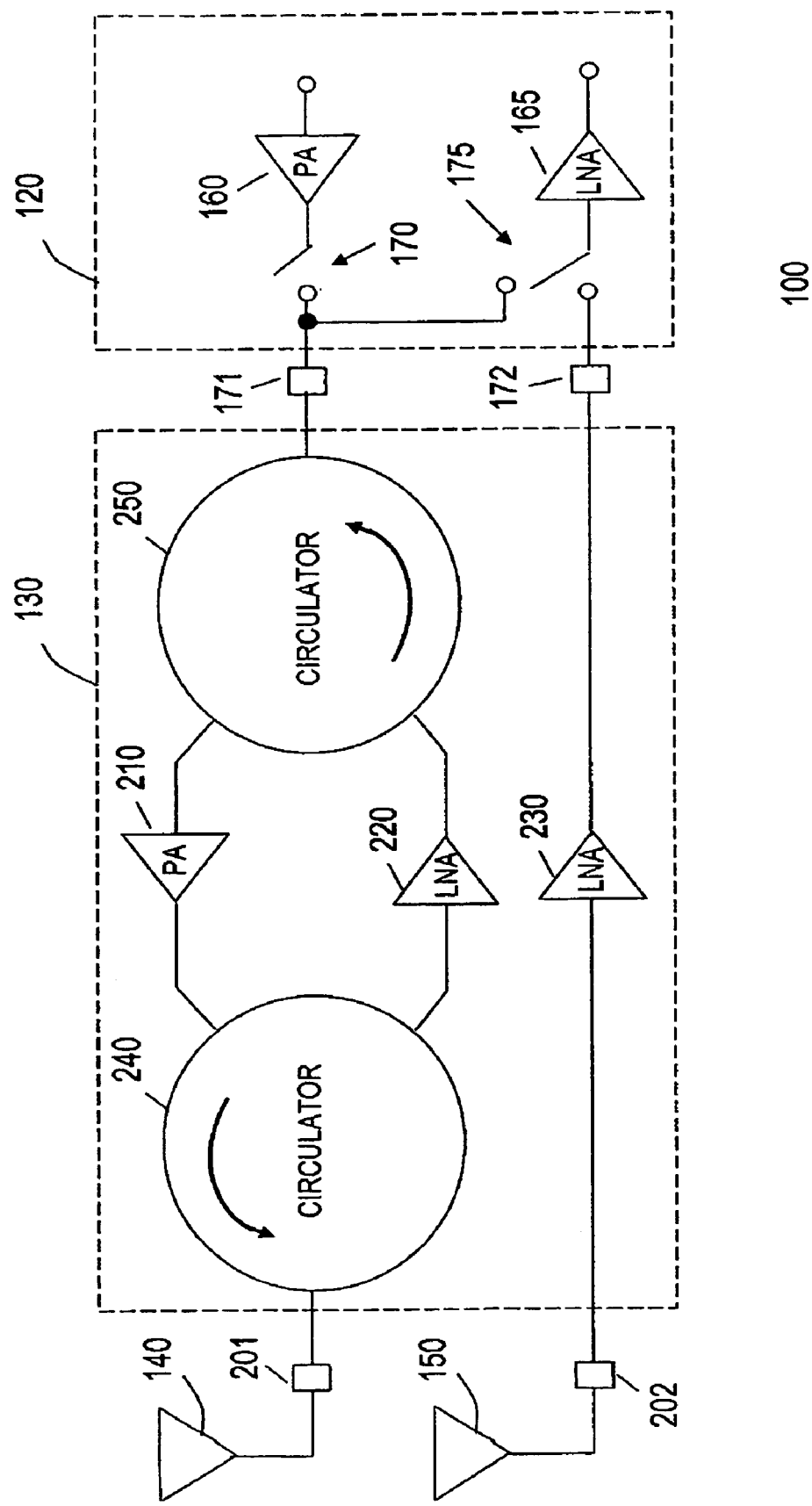
FIG. 2 is a schematic diagram illustrating a portion of a communication system in accordance with an embodiment of the present invention.

Turning to FIG. 2, an embodiment of a portion of communication system 100 is illustrated. Communication system 100 may include a range extender 130 and a wireless device 120. In one embodiment, wireless device 120 may be an access point, although the scope of the present invention is not limited in this respect. In other embodiments, wireless device 120 may also be a base station, a set-top box, a gateway, a multimedia center with wireless capability, or another device that may be adapted to transmit and receive information wirelessly. The gateway may include a digital subscriber line (DSL) modem or a cable modem, and a router. The multimedia center may include a personal video recorder (PVR) and a digital video disc (DVD) player. For simplicity, all the components of wireless device 120 have not been shown.

Although the scope of the present invention is not limited in this respect, communication system 100 may be used in any of the following systems: a wireless personal area network (WPAN) system, a wireless local area network (WLAN) system, a wireless metropolitan area network (WMAN) system, or a wireless wide area network (WWAN) system such as, for example, a cellular system. An example of a WLAN system includes a system substantially based on an Industrial Electrical and Electronics Engineers (IEEE) 802.11 standard. An example of a WMAN system includes a system substantially based on an Industrial Electrical and Electronics Engineers (IEEE) 802.16 standard. An example of a WPAN system includes a system substantially based on the Bluetooth™ standard (Bluetooth is a registered trademark of the Bluetooth Special Interest Group). Another example of a WPAN system includes a system substantially based on an Industrial Electrical and Electronics Engineers (IEEE) 802.15 standard such as, for example, the IEEE 802.15.3a specification using ultra-wideband (UWB) technology. Examples of cellular systems include: Code Division Multiple Access (CDMA) cellular radiotelephone communication systems, Global System for Mobile Communications (GSM) cellular radiotelephone systems, Enhanced data for GSM Evolution (EDGE) systems, North American Digital Cellular (NADC) cellular radiotelephone systems, Time Division Multiple Access (TDMA) systems, Extended-TDMA (E-TDMA) cellular radiotelephone systems, GPRS, third generation (3G) systems like Wideband CDMA (WCDMA), CDMA-2000, Universal Mobile Telecommunications System (UMTS), or the like.

Although the scope of the present invention is not limited in this respect, wireless device 120 may be coupled to range extender 130 using a proprietary mechanical interface. In alternate embodiments, wireless device 120 may be coupled to range extender 130 using a standard, non-proprietary mechanical interfaces.

A portion of a transceiver 155 of wireless device 120 is illustrated in FIG. 2. Transceiver 155 may comprise a transmitting portion, or transmit path, that may include a power amplifier (PA) 160. In addition, transceiver 155 may include a receiving portion, or receive path that may include a low noise amplifier (LNA) 165. Although the scope of the present invention is not limited in this respect, transceiver 155 may be implemented using a direct conversion or a super-heterodyne receiver architecture. For simplicity, all the components of transceiver 155 have not been shown.

The output terminal of PA 160 may be coupled to a terminal 171 via a switch 170. In this example, if switch 170 is open, then the output terminal of PA 160 may be disconnected from terminal 171. Conversely, if switch 170 is closed, the output terminal of PA 160 may be connected to terminal 171.

The input terminal of LNA 165 may be selectively coupled to either terminal 171 or terminal 172 using a switch 175. In one example, switch 175 may be in a first position to disconnect terminal 172 from the input terminal of LNA 165 and to connect terminal 171 to the input terminal of LNA 165. Alternatively, switch 175 may be in a second position to connect terminal 172 to the input terminal of LNA 165 and to disconnect terminal 171 from the input terminal of LNA 165. It should be noted that the use of the terms "first position" and "second position" is arbitrary.

In alternate embodiments, switches 170 and 175 may be implemented using transistors, diodes, or relays. For example, switches 170 and 175 may be implemented using PIN diodes, although the scope of the present invention is not limited in this respect. In another embodiment, switches 170 and 175 may be relatively low resistance switches such as, for example, micro-electromechanical systems (MEMS) switches. A MEMS switch may be a mechanical switch implemented using semiconductor materials and processes.

Terminal 171 may refer to either a terminal of wireless device 120 or a terminal of range extender 130. Similarly, terminal 172 may refer to either a terminal of wireless device 120 or a terminal of range extender 130.

Range extender 130 may include a power amplifier (PA) 210, low noise amplifiers (LNAs) 220 and 230, and circulators 240 and 250. Circulator 250 may have a terminal coupled to terminal 171, a terminal coupled to the input terminal of PA 210, and a terminal coupled to the output terminal of LNA 220. The terminals of circulators may also be referred to as ports. Circulator 240 may have a terminal coupled to the output terminal of PA 210, a terminal coupled to an antenna 140 via a terminal 201, and a terminal coupled to the input terminal of LNA 220. The input terminal of LNA 230 may be coupled to an antenna 150 via a terminal 202 and the output terminal of LNA 230 may be coupled to terminal 172. Terminal 201 may refer to either a terminal of range extender 130 or a terminal of antenna 140 and terminal 202 may refer to either a terminal of range extender 130 or a terminal of antenna 150.

Circulators 240 and 250 may be used to isolate transmit and receive paths in range extender 130. The use of a circulator may avoid the use of control signals supplied from wireless device 120. Circulators 240 and 250 may be passive devices that receive a signal at one input terminal, and provide this signal to the next terminal of the circulator in a counter clockwise direction. For example, using circulator 240, an amplified signal provided at the output terminal of PA 210 may be provided to terminal 201 and this amplified signal is not transmitted to the input terminal of LNA 220. Further, using circulator 240, a received signal received at terminal 201 may be transmitted to the input terminal of LNA 220 and this received signal is not transmitted to the output terminal of PA 210. In alternate embodiments, switches may be used in place of circulators 240. For example, see the embodiment illustrated in FIG. 3 discussed below.

Although the scope of the present invention is not limited in this respect, in one embodiment, communication system 100 may be part of a wireless local area network (WLAN) system such as, for example, a communication system substantially conforming to an IEEE 802.11 standard such as for example, the IEEE 802.11a, the IEEE 802.11b, or the IEEE 802.11g standards. In this embodiment, wireless device 120 may be a WLAN access point (AP) and the input terminal of PA 160 may be coupled to receive a radio frequency (RF) signal adapted to communicate information using a WLAN protocol.

If wireless device 120 is an 802.11a or 802.11g AP, then PA 160 may be coupled to receive at its input terminal, and amplify a RF signal modulated using an orthogonal frequency division multiplexing (OFDM) modulation scheme. Further, if wireless device 120 is a 802.11a or 802.11g AP, wireless device 120 may be adapted to communicate information at a range of up to about 100 meters (m), at a data rate of up to about 54 megabits/second (Mbps), using carrier signals centered at about 2.4 gigahertz (GHz) for 802.11g and about 5 GHz for 802.11a.

If wireless device 120 is an 802.11b AP, then PA 160 may be coupled to receive, and amplify a RF signal modulated using a complementary direct sequence spread spectrum (DSSS) and a complementary code keying (CCK) modulation scheme. In addition, if wireless device 120 is a 802.11b AP, wireless device 120 may be adapted to communicate information at a range of up to about 100 m, at a data rate of up to about 11 Mbps, using a carrier signal centered at about 2.4 GHz.

In another embodiment, communication system 100 may be part of a WMAN system such as, for example, a communication system substantially conforming to the IEEE 802.16a standard. In this embodiment, wireless device 120 may be a base station or client device and may be adapted to communicate information at a range of up to about 50 kilometers (km), at a data rate of up to about 134 megabits/second (Mbps), in a frequency range of about 2 GHz to about 11 GHz. In this example, PA 160 may be coupled to receive and amplify a RF signal modulated using an OFDM modulation scheme. For networks based on the IEEE 802.16a standard, information such as data, voice and multimedia may be transferred. The IEEE 802.16a technology is also known as WiMAX (Worldwide Interoperability for Microwave Access), which is the name of the industry forum established to support the standard and certify products based on it, similar to the Wi-Fi (Wireless Fidelity) Alliance for the IEEE 802.11b standard.

In one embodiment, power amplifiers 160 and 210 may be discrete devices relative to each other and may be used to increase the transmission range a RF signal received by PA 160. PAs 160 and 210 may be coupled in series in a transmit path so that RF signals are transmitted from the output terminal of PA 160 to the input terminal of PA 210. In one example, the output power of PA 160 may be about 17 dBm and the output power of PA 210 may be about 24 dBm. In this example, the addition of a second PA in the transmitter path may increase the transmission power of communication system 100. In other words, PA 210 of range extender 130 may be used to increase transmission power of communication system 100, thereby increasing or extending the communication range of this system in a network.

Although the scope of the present invention is not limited in this respect, in some embodiments, the output power of PA 160 may range from about 10 dBm to about 20 dBm. In other embodiments, the output power of PA 160 may be at least about zero dBm or about 4 dBm. For example, some wireless personal area network (WPAN) devices may have an output power of about zero dBm.

Range extender 130 may also be used to increase the receive sensitivity of the system. To accomplish this, range extender 130 may include at least one LNA discrete from LNA 165 and having a noise figure less than the noise figure of LNA 165. Accordingly, the addition of a second discrete LNA in the receive path may increase the overall noise figure of the receiver. For example, without range extender 130, LNA 165 may be capable of only receiving RF signals having a power level of about −84 dBm or greater. Communication system 100 may be capable of increasing the receive sensitivity to receive signals having a power level of at least about −90 dBm using range extender 130, which may provide an additional LNA (e.g., LNA 220 or 230) in series with LNA 165.

In one example, LNAs 220 and 230 may each have a gain of at least about 30 dB and a noise figure of less than about 4 dB. LNA 165 may have a gain of at least about 20 dB and a noise figure of less than about 10 dB.

Although the scope of the present invention is not limited in this respect, in one embodiment, a method to extend range and increase throughput in a WLAN system may include transmitting a WLAN signal using two discrete power amplifiers (e.g., PAs 160 and 210). A method to increase receiver sensitivity may include receiving a WLAN signal using two discrete LNAs (e.g., LNAs 130 and 165).

Although two LNAs are illustrated in range extender 130, this is not a limitation of the present invention. In alternate embodiments, only one LNA may be implemented in wireless device 130. This may be accomplished using switches and control signals from wireless device 120.

Antennas 140 and 150 may provide "antenna diversity" to reduce problems due to destructive interference from multipath fading or interference signals. Antennas 140 and 150 may be separated by a predetermined distance, e.g., at least about two centimeters (cm), to provide antenna diversity. In one embodiment, antennas 140 and 150 are separated by a distance of at least about 15 cm. The spatial separation of antennas 140 and 150 may decrease the likelihood that both antennas 140 and 150 receive the same combination of multipath-faded signals.

In some embodiments, antenna 140 may be used to transmit and receive signals such as, for example, radio frequency (RF) signals based on, e.g., an IEEE 802.11 or an IEEE 802.16 standard, and may be referred to as a primary antenna, a transmit antenna, or a transmit and receive antenna. Antenna 140 may be used to transmit signals over the air. Antenna 150 may be used to receive signals and may be referred to as a secondary antenna, diversity antenna, or a receive only antenna.

In one embodiment, antenna diversity may be accomplished by measuring the signal strength of signals received from antennas 140 and 150 using circuitry of transceiver 155 not shown in FIG. 2. The signal strength of signals received using antennas 140 and 150 may be compared by circuitry (not shown) of transceiver 155. In one embodiment, if the signal strength of a signal received using antenna 150 is greater than the signal strength of a signal received using antenna 140, then antenna 150 may be used to receive signals by coupling the input terminal of LNA 165 to antenna 150 and disconnecting the input terminal of LNA 165 from antenna 140.

Figure 3:
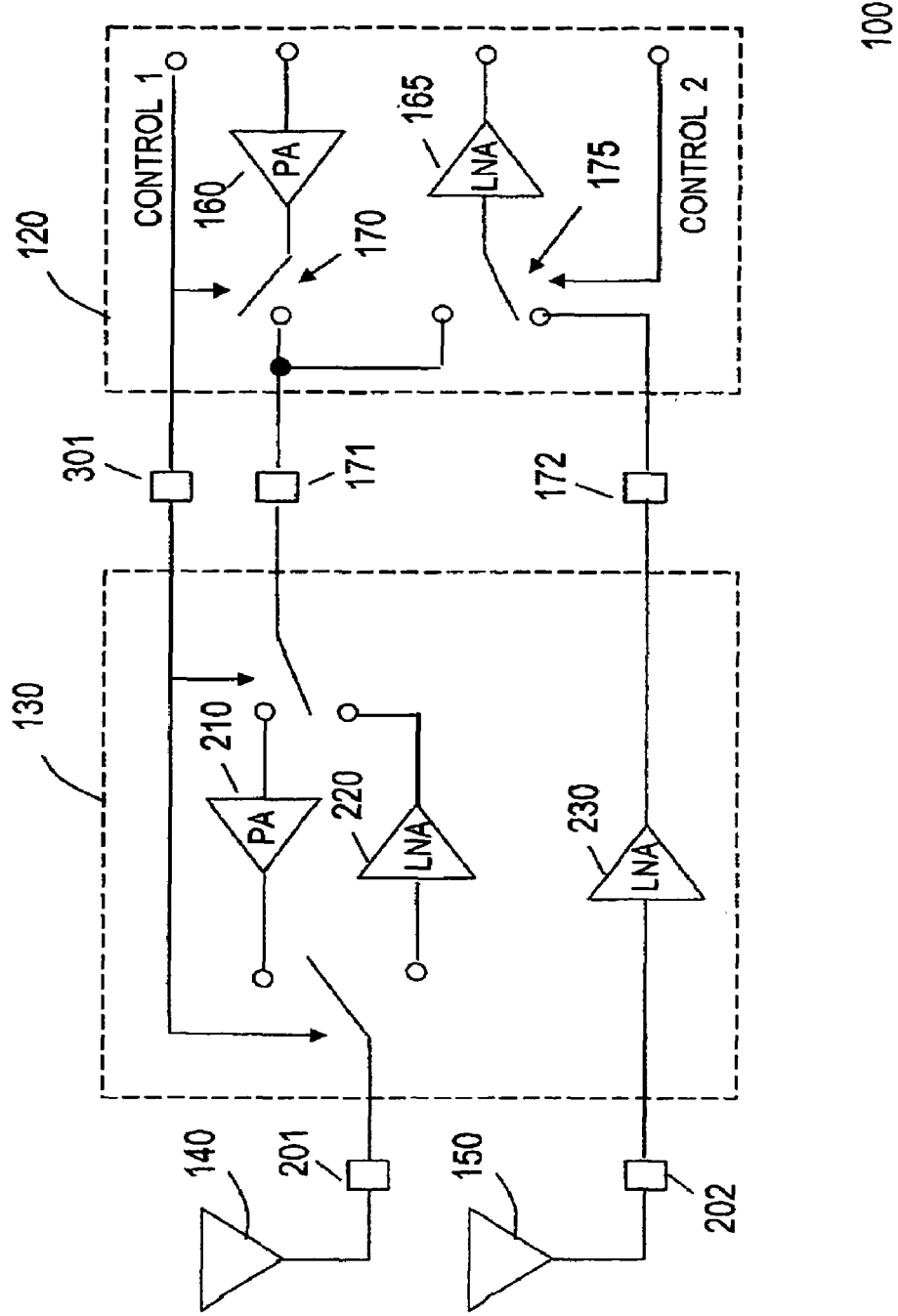
FIG. 3 is a block diagram illustrating a portion of a communication system in accordance with an embodiment of the present invention.

Turning to FIG. 3, another embodiment of a portion of communication system 100 is illustrated. In this embodiment, switches 310 and 320 may be used in place of circulators. A control signal labeled CONTROL1 may be used to control switches 170, 310, and 320. Signal CONTROL1 may be provided to range extender 130 via a terminal 301. A control signal labeled CONTROL2 may be used to control switch 175.

Although the scope of the present invention is not limited in this respect, transceiver 155 may be adapted to process a variety of wireless communication protocols such wireless personal area network (WPAN) protocols, wireless local area network (WLAN) protocols, wireless metropolitan area network (WMAN) protocols, or cellular protocols.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system, comprising:
    a first discrete power amplifier having an input terminal coupled to receive a signal modulated using an orthogonal frequency division multiplexing (OFDM) modulation scheme;
    a second discrete power amplifier having an input terminal coupled to an output terminal of the first discrete power amplifier;
    a primary antenna coupled to an output terminal of second discrete power amplifier;
    a first discrete low noise amplifier (LNA);
    a second discrete low noise amplifier (LNA) having an input terminal coupled to the primary antenna and an output terminal coupled to an input terminal of the first discrete low noise amplifier;
    a diversity antenna; and
    a third discrete low noise amplifier (LNA) having an input terminal coupled to the diversity antenna and an output terminal coupled to the input terminal of the first low noise amplifier.

2. The system of claim 1, wherein the output power of the second discrete power amplifier is about 30 dBm or less.

3. An apparatus to extend communication range in a wireless personal area network (WPAN) system, a wireless local area network (WLAN) system, or a wireless metropolitan area network (WMAN) system, comprising:
    a first power amplifier (PA);

a first low noise amplifier (LNA);

a first circulator having a first terminal coupled to a first terminal of the first power amplifier, a second terminal coupled to a first terminal of the first low noise amplifier, and a third terminal coupled to a first terminal of the apparatus;

a second circulator having a first terminal coupled to a second terminal of the power amplifier, a second terminal coupled to a second terminal of the first low noise amplifier, and a third terminal coupled to a second terminal of the apparatus that is adapted to be coupled to a primary antenna; and a second low noise amplifier having a first terminal coupled to a third terminal of the apparatus that is adapted to be coupled to a diversity antenna and a second terminal coupled to a fourth terminal of the apparatus.

4. The apparatus of claim 1, wherein the WLAN system is a system substantially based on an Industrial Electrical and Electronics Engineers (IEEE) 802.11 standard and the WMAN system is a system substantially based on an Industrial Electrical and Electronics Engineers (IEEE) 802.16 standard.

5. The apparatus of claim 3, wherein the first power amplifier has an output power of about 30 dBm or less and the first low noise amplifier has a gain of at least about 30 dB and a noise figure of less than about 6 dB.

\* \* \* \* \*

UNITED STATES PATENT AND TRADEMARK OFFICE
CERTIFICATE OF CORRECTION

PATENT NO. : 7,440,496 B2 Page 1 of 1
APPLICATION NO. : 10/646448
DATED : October 21, 2008
INVENTOR(S) : Peek et al.

It is certified that error appears in the above-identified patent and that said Letters Patent is hereby corrected as shown below:

In column 8, line 3, in Claim 4, delete "claim 1," and insert -- claim 3, --, therefor.

Signed and Sealed this

Tenth Day of March, 2009

JOHN DOLL
*Acting Director of the United States Patent and Trademark Office*